US009675874B1

United States Patent
Park

(10) Patent No.: US 9,675,874 B1
(45) Date of Patent: Jun. 13, 2017

(54) MULTI-PLAYER GAMING SYSTEM

(71) Applicant: nWay, Inc., San Francisco, CA (US)

(72) Inventor: Ho Sung Park, Union City, CA (US)

(*) Notice: Subject to any disclaimer, the term of this patent is extended or adjusted under 35 U.S.C. 154(b) by 313 days.

(21) Appl. No.: 14/335,250

(22) Filed: Jul. 18, 2014

Related U.S. Application Data

(60) Provisional application No. 61/847,902, filed on Jul. 18, 2013.

(51) Int. Cl.
*A63F 13/30* (2014.01)
*A63F 13/75* (2014.01)
*G07F 17/32* (2006.01)
*H04L 29/06* (2006.01)

(52) U.S. Cl.
CPC .............. *A63F 13/12* (2013.01); *A63F 13/75* (2014.09); *G07F 17/3241* (2013.01); *H04L 29/06034* (2013.01)

(58) Field of Classification Search
CPC ...... A63F 13/75; A63F 13/12; G07F 17/3241; H04L 29/06034
See application file for complete search history.

(56) References Cited

U.S. PATENT DOCUMENTS

| | | | | |
|---|---|---|---|---|
| 2008/0268961 | A1* | 10/2008 | Brook | ............. A63F 13/12 463/42 |
| 2014/0292803 | A1* | 10/2014 | Cook | ............. G06T 15/00 345/619 |
| 2014/0317382 | A1* | 10/2014 | Segelken | ......... G06F 9/3873 712/205 |

OTHER PUBLICATIONS

Matt Pritchard, How to Hurt the Hackers: The Scoop on Internet Cheating and How You Can Combat It, Jul. 24, 2000, Gamasutra.com, available at <<http://www.gamasutra.com/view/feature/3149/how_to_hurt_the_hackers_the_scoop_.php?print=1>>.*

Charles Severance, An Interview with the Old Man of Floating-Point, Feb. 20, 1998, available at <<https://people.eecs.berkeley.edu/~wkahan/ieee754status/754story.html>>.*

Toru Morinaga, Kazunori Mano, Takao Kaneko, The Forward-Backward Recovery Sub-Code (FB-RSC) Method: A Robust Form of Packet-Loss Concealment for use in Broadband IP Networks, 2002, IEEE, pp. 62-64.*

* cited by examiner

*Primary Examiner* — Werner Garner
(74) *Attorney, Agent, or Firm* — Patent Law Works LLP

(57) ABSTRACT

The disclosure includes a system and method for providing a multi-player gaming service to users. The system includes a processor; and a memory storing instructions when executed cause the system to: receive game inputs from two or more devices; simulate the game session from a starting state to an ending state by sequentially applying received game inputs at each frame; and store the ending state of the game session.

20 Claims, 11 Drawing Sheets

MULTI-PLAYER GAMING SYSTEM

RELATED APPLICATIONS

This application claims the benefit of U.S. Provisional Application Ser. No. 61/847,902, filed Jul. 18, 2013 which is hereby incorporated by reference.

BACKGROUND

The specification relates to online gaming systems. In particular, the specification relates to a system and method for providing a multi-player gaming service to users.

Gaming technologies based on a common user datagram protocol (UDP) has high latency. For example, after sending a sequence of data to a second player device, a first player device needs to wait for an acknowledgement from the second player device before sending other sequences of data to the second player device. Furthermore, de-synchronization problems and hacking problems may occur when two or more players play an online game using different player devices. For example, even if the player devices receive the same keystroke inputs at the same time, an outcome of the game can be affected by the different computing capabilities of the player devices.

SUMMARY

According to one innovative aspect of the subject matter described in this disclosure, a system for providing a multi-player gaming service to users includes a processor and a memory storing instructions when executed cause the system to: receive game inputs from two or more devices, each game input being associated with a frame in a game session; simulate the game session from a starting state to an ending state by sequentially applying received game inputs at each frame; and store the ending state of the game session.

In general, another innovative aspect of the subject matter described in this disclosure may be embodied in methods that include: detecting a first set of game inputs for a frame in a game session on a first device; transmitting the first set of game inputs to a second device; receiving a second set of game inputs from a second device, the second set of games inputs being associated with the frame in the game session; simulating the frame to produce a game state by applying the first set of game inputs and the second set of game inputs to the frame in the game session, the game state being consistently simulated on disparate hardware; and rendering a perspective for the frame based on the game state.

Other aspects include corresponding methods, systems, apparatus, and computer program products for these and other innovative aspects.

The present disclosure may be particularly advantageous in a number of respects. First, the system applies a simulator in each device to prevent de-synchronization between players as well as hacking problems in a peer-to-peer network. Second, the system implements a low-latency UDP mechanism to provide users with faster gaming speed. Third, the system automatically performs a packet recovery procedure to recover lost frames. The foregoing advantages are illustrated by way of example, and it should be understood that the present disclosure may have numerous other advantages.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
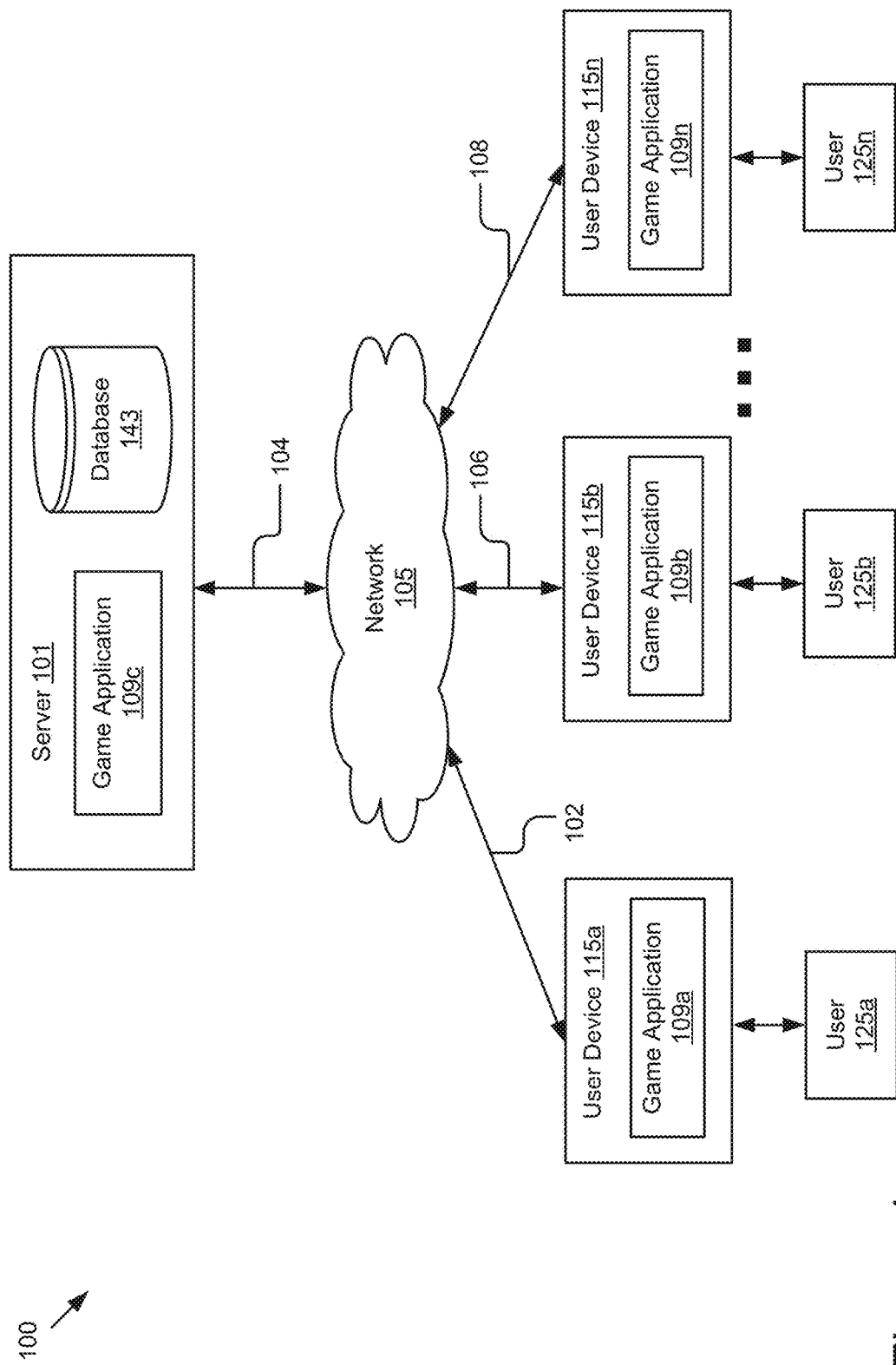
FIG. 1 is a block diagram illustrating an example system for providing a multi-player gaming service to users according to some implementations.

FIG. 1 is a block diagram illustrating an example system 100 for providing a multi-player gaming service to users according to some implementations. The illustrated system 100 includes a server 101 and one or more user devices 115a, 115b . . . 115n that can be accessed by one or more users 125a, 125b . . . 125n. In FIG. 1 and the remaining figures, a letter after a reference number, e.g., "115a," represents a reference to the element having that particular reference number. A reference number in the text without a following letter, e.g., "115," represents a general reference to implementations of the element bearing that reference number. In the illustrated implementation, these entities of the system 100 are communicatively coupled via a network 105. While FIG. 1 illustrates three user devices 115a, 115b, 115n and one server 101, the present disclosure applies to a system architecture having one or more user devices 115 and/or one or more servers 101. Furthermore, although FIG. 1 illustrates one network 105 coupled to the user devices 115a, 115b . . . 115n and the server 101, in practice one or more networks 105 can be connected to these entities.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some implementations, the network 105 may be a peer-to-peer network. The network 105 may also be coupled to or includes portions of a telecommunications network for sending data in a variety of different communication protocols. In some implementations, the network 105 includes Bluetooth communication networks or a cellular communications network for sending and receiving data including via short messaging service (SMS), multimedia messaging service (MMS), hypertext transfer protocol (HTTP), direct data connection, WAP, email, etc.

In some implementations, the user device 115 may be a computing device that includes a memory and a processor, for example a laptop computer, a desktop computer, a tablet computer, a mobile telephone, a personal digital assistant (PDA), a mobile email device, a portable game player, a game controller, a portable music player or other electronic device capable of accessing a network 105. A user 125 can be a game player participating in a game. In the illustrated implementation, the user 125$a$ interacts with the user device 115$a$, which is communicatively coupled to the network 105 via signal line 102. The user device 115$a$ includes a game application 109$a$. The user 125$b$ interacts with the user device 115$b$, which is communicatively coupled to the network 105 via signal line 106. The user device 115$b$ includes a game application 109$b$. The user 125$n$ interacts with the user device 115$n$, which is communicatively coupled to the network 105 via signal line 108. The user device 115$n$ includes a game application 109$n$.

The game application 109 can be code and routines for providing a gaming service to a user. In some implementations, the game application 109 can be implemented using hardware including a field-programmable gate array (FPGA) or an application-specific integrated circuit (ASIC). In some other implementations, the game application 109 can be implemented using a combination of hardware and software. In some implementations, the game application 109 may be stored in a combination of the devices and servers, or in one of the devices or servers. The game application 109 is described below in more detail with reference to FIGS. 2-7.

In some implementations, the users 125$a$, 125$b$ . . . 125$n$ that operate on the user devices 115$a$, 115$b$ . . . 115$n$ participate in a multi-player game in a peer-to-peer (P2P) network, and each user device 115 associated with a user 125 acts as a peer in the P2P network. Each user 125 shares his or her game inputs (e.g., key inputs, keystrokes, etc.) with other users participating in the same game via the P2P network. For example, each player sends his or her keystrokes to each of the other players continuously by applying a user datagram protocol (UDP) without waiting for any acknowledgements from the other players, resulting in low latency in the game playing. For example, signal lines 102, 104, 106 and 108 represent low-latency UDP communications between peers in the P2P network. An example mechanism using the low-latency UDP to communicate game inputs between the game players is illustrated in FIG. 7.

The server 101 can be a hardware server that includes a processor, a memory and network communication capabilities. The server 101 is communicatively coupled to the network 105 via signal line 104. In some implementations, the server 101 sends and receives data to and from the user devices 115 via the network 105. In some implementations, the server 101 is a social network server that provides a social network service to users. For example, one or more users can play an online game together and publish a game result on a social network. A social network can be a type of social structure where the users may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related. In some implementations, the server 101 is a game server that provides one or more online games to users. In some other implementations, the server 101 can be another type of servers that provides other service to users.

In the illustrated implementation, the server 101 includes a game application 109$c$ and a database 143. The game application 109$c$ provides similar functionality as the game applications 109$a$ and 109$b$, and the description will not be repeated here. The database 143 can be a non-transitory memory that stores data for providing the functionality described herein. For example, the game application 109$c$ receives all the players' game inputs for a game from the corresponding user devices 115, simulates a game result for the game using the players' game inputs, and stores the game result in the database 143. The database 143 may store other data associated with the server 101. The database 143 may be a dynamic random access memory (DRAM) device, a static random access memory (SRAM) device, flash memory or some other memory devices. In some implementations, the storage device 243 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Figure 2:
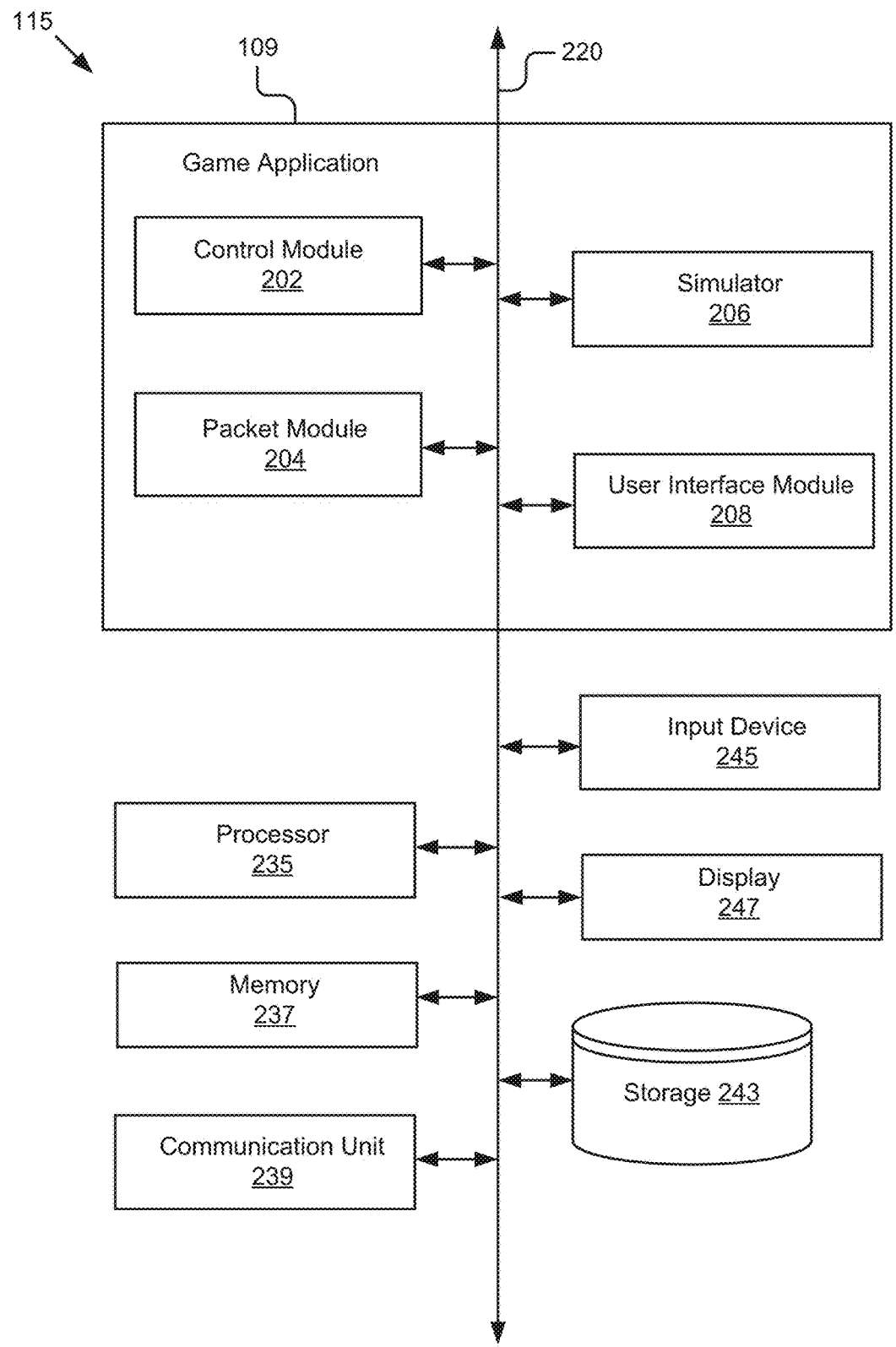
FIG. 2 is a block diagram illustrating an example game application according to some implementations.

Referring to FIG. 2, the game application 109 is shown in more detail. FIG. 2 is a block diagram illustrating a user device 115 that includes a game application 109, a processor 235, a memory 237, a communication unit 239, an input device 245, a display 247 and a storage device 243 according to some examples. The components of the user device 115 are communicatively coupled by a bus 220.

The processor 235 includes an arithmetic logic unit, a microprocessor, a general purpose controller or some other processor array to perform computations and provide electronic display signals to a display device. Processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations are possible.

The memory 237 stores instructions and/or data that may be executed by the processor 235. The instructions and/or data may include code for performing the techniques described herein. The memory 237 may be a dynamic random access memory (DRAM) device, a static random access memory (SRAM) device, flash memory or some other memory device. In some implementations, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 239 transmits and receives data to and from the server 101 or user device 115 depending upon where the game application 109 is stored. In some implementations, the communication unit 239 includes a port for direct physical connection to the network 105 or to another communication channel. For example, the communication unit 239 includes a USB, SD, CAT-5 or similar port for wired communication with the server 101 or user device 115. In some implementations, the communication unit 239 includes a wireless transceiver for exchanging data with the server 101 or other communication channels using one or more wireless communication methods, including IEEE 802.11, IEEE 802.16, BLUETOOTH® or another suitable wireless communication method.

In some implementations, the communication unit 239 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some implementations, the communication unit 239 includes a wired port and a wireless transceiver. The communication unit 239 also provides other conventional connections to the network 105 for distribution of files and/or media objects using standard network protocols including TCP/IP, HTTP, HTTPS and SMTP, etc.

The input device 245 can be any device to input data to the user device 115. For example, the input device 245 is one of a game controller, a touch-sensitive device that receives gestural commands (e.g., a tap, double tap, scroll, swipe, etc.) from a user, a mouse, a track ball or other type of pointing device to input data into the user device 115. In some implementations, the input device 245 includes one or more of a keyboard (e.g., a QWERTY keyboard), a microphone, a web camera or similar audio or video capture device.

The display 247 can be a conventional type such as a liquid crystal display (LCD) or any other similarly equipped display device, screen or monitor. The display 247 represents any device equipped to display electronic images and data as described herein. In some implementations, the input device 245 and the display 247 are integrated to form a touch screen.

The storage device 243 can be a non-transitory memory that stores data for providing the functionality described herein. The storage device 243 may be a dynamic random access memory (DRAM) device, a static random access memory (SRAM) device, flash memory or some other memory devices. In some implementations, the storage device 243 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some implementations, the storage device 243 stores game inputs (e.g., keystrokes) provided by a user operating on the user device 115. The storage device 243 also stores packets including game inputs received from other users and a game result for the game participated by the user and other users. The storage device 243 may store any other data for providing the functionality described herein.

In the illustrated implementation shown in FIG. 2, the game application 109 includes a control module 202, a packet module 204, a simulator 206 and a user interface module 208. These components of the game application 109 are communicatively coupled to each other via the bus 220.

The control module 202 can be software including routines for handling communications between the game application 109 and other components of the user device 115. In some implementations, the control module 202 can be a set of instructions executable by the processor 235 to provide the functionality described below for handling communications between the game application 109 and other components of the user device 115. In some other implementations, the control module 202 can be stored in the memory 237 of the user device 115 and can be accessible and executable by the processor 235. The control module 202 may be adapted for cooperation and communication with the processor 235 and other components of the user device 115 via the bus 220.

The control module 202 sends and receives data, via the communication unit 239, to and from other entities of the system 100. For example, the control module 202 receives, via the communication unit 239, one or more packets from other user devices 115 operated by other players participating in a game, and sends the one or more packets to the packet module 204. In some implementations, the control module 202 handles communications between components of the game application 109. For example, the control module 202 receives data describing a game result from the simulator 206 and sends the data to the user interface module 208 for presenting the game result to the user.

In some implementations, the control module 202 receives data from components of the game application 109 and stores the data in the storage device 243. For example, the control module 202 receives a game result from the simulator 206 and stores the game result in the storage device 243. In some implementations, the control module 202 retrieves data from the storage device 243 and sends the data to components of the game application 109. For example, the control module 202 retrieves all the game inputs provided by the user in a game from the storage device 243, and sends the user's game inputs to the server 101 for auditing the game result using the user's game inputs and other participants' game inputs.

The packet module 204 can be software including routines for processing packets. In some implementations, the packet module 204 can be a set of instructions executable by the processor 235 to provide the functionality described below for processing packets. In some other implementations, the packet module 204 can be stored in the memory 237 of the user device 115 and can be accessible and executable by the processor 235. The packet module 204 may be adapted for cooperation and communication with the processor 235 and other components of the user device 115 via the bus 220.

In some implementations, the packet module 204 receives a game input from a first user operating on a first user device 115. For example, the packet module 204 receives a keystroke from a first player participating in a game via the control module 202. The packet module 204 generates an outbound frame that includes the first user's game input. An outbound frame can be a frame of data including a game input provided by the first user and to be sent from the first user device 115 to a second user device 115 operated by a second user, where the first user and the second user participate in the same game. The packet module 204 generates an outbound packet associated with the first user and sends the outbound packet to the second user device 115 associated with the second user.

An outbound packet can be a packet of data including one or more outbound frames to be sent from the first user device 115 to the second user device 115. In some implementations, an outbound packet includes one or more consecutive outbound frames. For example, the packet module 204 generates the following example outbound packets sequentially and sends each outbound packet to the second user device 115:

$1^{st}$ outbound packet: $1^{st}$ frame, $2^{nd}$ frame, $3^{rd}$ frame;

$2^{nd}$ outbound packet: $1^{st}$ frame, $2^{nd}$ frame, $3^{rd}$ frame, $4^{th}$ frame;

$3^{rd}$ outbound packet: $2^{nd}$ frame, $3^{rd}$ frame, $4^{th}$ frame, $5^{th}$ frame;

$4^{th}$ outbound packet: $3^{rd}$ frame, $4^{th}$ frame, $5^{th}$ frame, $6^{th}$ frame; and 5$^{th}$ outbound packet: 4$^{th}$ frame, 5$^{th}$ frame, 6$^{th}$ frame, 7$^{th}$ frame.

Each of the 2$^{nd}$, 3$^{rd}$, 4$^{th}$ and 5$^{th}$ outbound packets includes 4 consecutive outbound frames. In this example, the 1$^{st}$ outbound packet only includes 3 outbound frames (1$^{st}$ frame, 2$^{nd}$ frame and 3$^{rd}$ frame). The packet module 204 transfers the 1$^{st}$ outbound packet to the second user device 115 without waiting for the 4$^{th}$ frame in order to reduce transmission latency. In some examples, the 1$^{st}$ outbound packet can include only one outbound frame or two outbound frames in order to reduce transmission latency further. The 1$^{st}$ outbound packet can also include the same number of outbound frames as the other outbound packets.

In some implementations, if an outbound packet has N outbound frames (e.g., N=1, 2, 3, 4 . . . ), only an outbound frame in the outbound packet is a new game input and the other N−1 outbound frames are previous game inputs included in one or more previous outbound packets. This outbound packet has a redundancy of N−1 frames. Referring to the above example, when comparing to a previous or a following outbound packet, each outbound packet has a redundancy of 3 frames. For example, comparing to the 3$^{rd}$ outbound packet, the 4$^{th}$ outbound packet has only a new frame (the 6$^{th}$ frame) and 3 redundant frames (the 3$^{rd}$, 4$^{th}$ and 5$^{th}$ frames).

The redundancy in the packet is beneficial in numerous respects. For example, if one or more packets are missing, the packet module 204 may recover missing frames from other neighboring packets. Referring to the above example, assume the second user device 115 that corresponds to the second user only receives the 1$^{st}$ and 5$^{th}$ packets from the first user device 115, and 3 consecutive packets (e.g., the 2$^{nd}$, 3$^{rd}$ and 4$^{th}$ packets) are lost. Because the packets has a redundancy of 3 frames, a packet module 204 executed on the second user device 115 is capable of recovering the 4$^{th}$, 5$^{th}$ and 6$^{th}$ frames from the 5$^{th}$ packets.

While sending an outbound packet to the second user device 115 that corresponds to the second user participating in the game, the packet module 204 also receives an inbound packet from the second user device 115. The inbound packet includes the second user's game input. An inbound packet can be a packet of data including one or more inbound frames received from a second user device 115 that corresponds to a second user participating in the same game. The inbound packet has a similar structure as the outbound packet, except that the outbound packet includes the first user's game inputs and to be sent to the second user device 115 while the inbound packet includes the second user's game inputs and received from the second user device 115. The packet module 204 determines the second user's game input from the inbound packet. For example, the packet module 204 determines the new game input from the current inbound packet by removing other game inputs that are already included in the previous inbound packets. The packet module 204 sends the first user's game input and the second user's game input to the simulator 206.

In some implementations, if some of the inbound packets are missing, the packet module 204 determines whether any inbound frame is missing. For example, the packet module 204 determines whether all the inbound frames included in the missing packets are included in other received inbound packets. If one or more inbound frames are not included in the other received inbound packets, the one or inbound frames are missing. If at least one inbound frame is missing and cannot be recovered from the other received inbound packets, the packet module 204 performs a packet recovery procedure to recover the lost inbound frame. For example, the packet module 204 stored in the first user device 115 determines that a particular frame from the second device 115 is lost and therefore resends a packet to the second user device 115, where the packet causes the second user device 115 to resend the lost frame to the packet module 204. The automatic packet recovery procedure is described below in more detail with reference to FIG. 5.

The simulator 206 can be software including routines for rendering a game output based on users' game inputs. In some implementations, the simulator 206 can be a set of instructions executable by the processor 235 to provide the functionality described below for rendering a game output based on users' game input. In some other implementations, the simulator 206 can be stored in the memory 237 of the user device 115 and can be accessible and executable by the processor 235. The simulator 206 may be adapted for cooperation and communication with the processor 235 and other components of the user device 115 via the bus 220.

In some implementations, the simulator 206 stored on the first user device 115 receives the first user's game input and the second user's game input from the packet module 204, and renders a game output for the game based on the first user's game input and the second user's game input. In some examples, a game output can be an intermediate result of a game. In some other examples, a game output can be a final result of a game. In some implementations, the simulator 206 is configured to perform integer calculations and produce the same game output if the same game inputs are provided even if the simulator 206 is stored on different computing devices having different computing capabilities. In other words, the game output rendered by the simulator 206 may not be affected by the computing capabilities of the user devices 115.

This is beneficial because the simulator 206 facilitates synchronization between the first and second user devices 115 and solves the de-synchronization problem that might occur between the first and second user devices 115. For example, referring to FIG. 6, each user device 115 has a simulator 206. The simulator 206 associated with Player 1 receives a first game input from Player 1 and a second game input from Player 2 via the low-latency UDP transmission in near real time. Similarly, the simulator 206 associated with Player 2 receives the first game input from Player 1 via the low-latency UDP transmission in near real time and the second game input from Player 2. The respective simulator 206 associated with each player simulates the game output based on the first game input and the second game input. Because the rendering of the game output is directly controlled by the simulator 206 on each user device 115, it is unlikely for the two players to desynchronize with each other due to the difference of the computing capabilities of the user devices 115. For example, even if the first user device 115 operated by Player 1 has a faster computing speed than the second user device 115 operated by Player 2, the same game output would be rendered on the first and second user devices 115 because the simulators 206 stored on the user devices 115 control and synchronize the game output.

In some implementations, the simulator 206 is stored on the server 101 and receives game inputs from all the users participating in a game. The simulator 206 does not need to receive the game inputs from the users in real time. For example, the simulator 206 can receive the game inputs after the users finish the game. The simulator 206 simulates a game result for the game using the game inputs. For example, after completion of a game played by two players, the simulator 206 stored on the server 101 receives all the keystrokes inputted by the two players from the user devices 115, replays the game using the keystrokes to generate a game result, and stores the game result in a database 143 associated with the server 101.

The simulation of the game on the server 101 can solve the hacking problem that exists in P2P games. For example, assume a first player hacks a first simulator 206 stored on the first user device 115 in order to increase the processing speed of the first simulator 206. The first player may observe a first game result generated from the increased processing speed on his screen. However, the first game result is different from a second game result generated by a second simulator 206 stored on a second user device 115 operated by a second player, because the hacking action to increase the processing speed at the first simulator 206 does not affect the second simulator 206. When a third simulator 206 stored on the server 101 replays the game using all the first player's game inputs and the second player's game inputs, the third simulator 206 generates the same game result as the second player's game result and store the game result in the database 143 associated with the server 101.

The user interface module 208 can be software including routines for generating graphical data for providing user interfaces to users. In some implementations, the user interface module 208 can be a set of instructions executable by the processor 235 to provide the functionality described below for generating graphical data for providing user interfaces to users. In some other implementations, the user interface module 208 can be stored in the memory 237 of the user device 115 and can be accessible and executable by the processor 235. The user interface module 208 may be adapted for cooperation and communication with the processor 235 and other components of the user device 115 via the bus 220.

In some implementations, the user interface module 208 generates graphical data for providing a user interface that depicts a game result. The user interface module 208 sends the graphical data to the user device 115, causing the user device 115 to present the user interface to the user. The user interface module 208 may generate graphical data for providing other user interfaces to users.

The foregoing description of FIG. 2 illustrates an example scenario where two users (e.g., the first user and the second user) play in the same game. It should be understood that in some implementations more than two users (e.g., 4 players) can participate in the same game simultaneously and similar operations can be performed.

Figure 3:
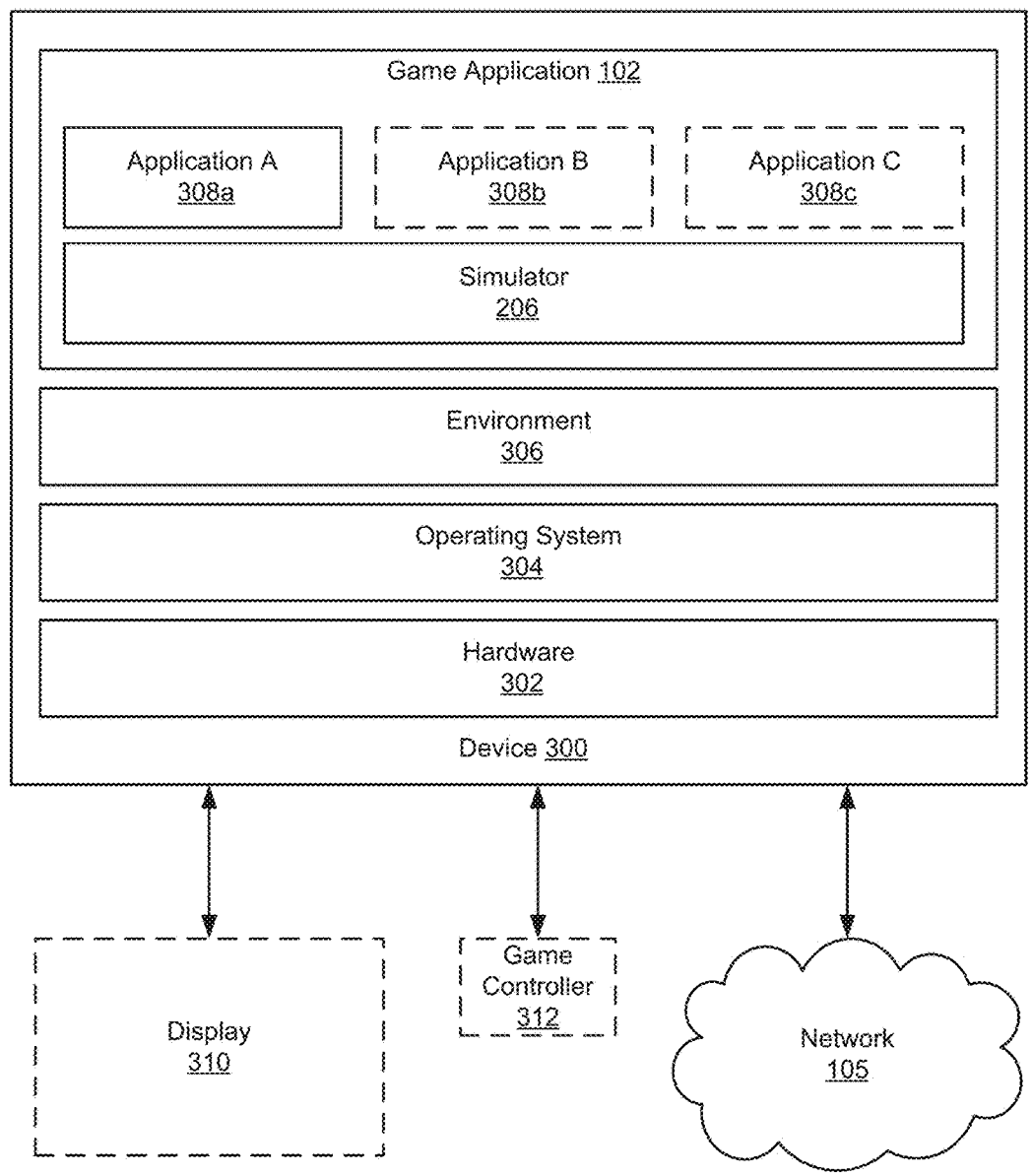
FIG. 3 is a block diagram illustrating an example device with a simulator.

FIG. 3 is a block diagram illustrating an example device 300 with a simulator 206. In some instances, the device 300 may be the user device 115. In other instances, the device 300 may be the server 101. One difference between the server 101 and the user device 115 may be the inclusion of a display 310 and/or a game controller 312. While the server 101 or the user device 115 may include the display 310 and/or the game controller 312, the display 310 and the game controller 312 are optional features as depicted by the dotted line.

The game controller 312 may be a variety of human-input devices including but not limited to a joystick, a keyboard, a mouse, and a game-pad. The display 310 may include any visual output for the user. As a couple of example, the display 310 may be a liquid crystal display (LCD) or a projected picture. The device 300 may be connected to the network 105 as outlined above. In this way, the device 300 may be communicatively connected to other devices (e.g. user devices 115 or the server 101).

The device 300 may include various layers of hardware and software. In particular, the device 300 includes a set of hardware 302. The set of hardware may include one or more central processing units (CPUs), memory, storage space, and one or more graphical processing units (GPUs), as a few non-limiting illustrative examples. Other devices communicatively connected to the device 300 via the network 105 may have similar hardware or disparate hardware. Moreover, some of these other device may be used to participate in a multiplayer game with the device 300. In this way, the devices in a multiplayer game according to this disclosure may include disparate hardware. Similarly, the device includes an operating system 304 which may be different on different devices engaged in multiplayer gaming according to this disclosure. Some devices may further include an environment 306 such as a browser, a user interface shell, or a virtualized platform, as a few examples. Different devices engaged in multiplayer gaming may include different environments.

A feature of the technology is the simulator 206 which may allow users on disparate devices with potentially disparate hardware and/or software, such as those outlines above, to engage in multiplayer gaming. The simulator 206 allows disparate various application 308*a-c* to be consistently simulated on disparate hardware and/or software. More particularly, the simulator 206 may allow an ending state to be consistently simulated by on disparate hardware. As an example, two devices may have different CPUs and/or GPUs. As a few other examples, two devices may include disparate instruction set architectures and/or floating point precision capabilities. In some examples, one or more applications 308 may be packaged together with the simulator 206 into a game application 102 or a bundled package of game applications.

In some cases, the device 300 may be associated with a player. As an example, a player may view game play on the display 310 and interact with the game with the game controller 312. In this way, the device 300 may render a perspective for the user on the display 300 and may receive game inputs from the user via the game controller 312. The device 300 may also receive game inputs from a remote user not associated with the device 300. In particular, a device associated competitor player in the multiplayer gaming may send the device 300 game inputs over the network 105. The device may use these remote game inputs to simulate game play and render the perspective for the user associated with the device 300. More precisely, each game input may be associated with a frame in a game session and the same session may be simulated from inputs from two or more devices from a starting state to an ending state by sequentially applying received game inputs at each frame. As an example, the device 300 may simulate game play from a stating state frame n−1 by applying all of the game inputs for frame n to the game state n−1 to arrive at ending state n. In a more comprehensive example, the device 300 may simulate a game session from a starting state n=0 to an ending state where all the frames have been applied. Use of the device 300 in this manner may be particularly useful for the server 101 checking for cheating that may have occurred during game play and storing the ending state of the game session to storage.

Figure 4:
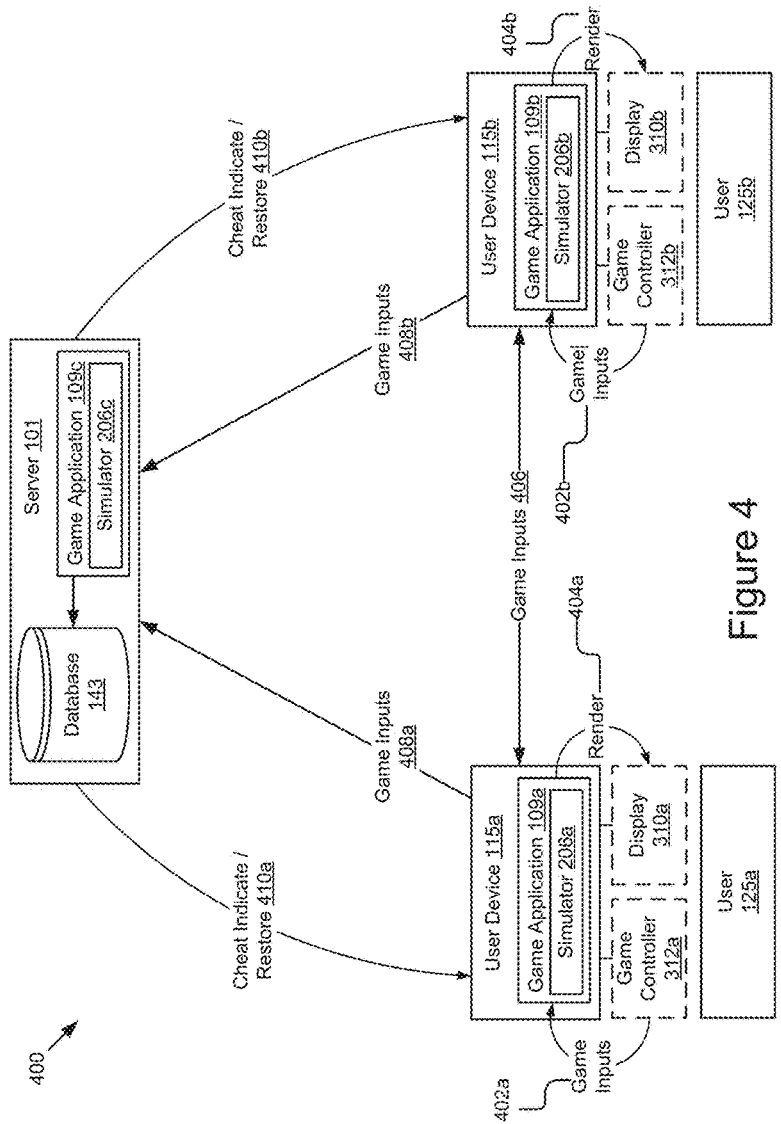
FIG. 4 is a graphic representation illustrating an example gaming system with a simulator on each device according to some implementations.

FIG. 4 is a graphic representation illustrating a gaming system 400 with a simulator 206*a-c* on each device according to some implementations. The gaming system 400 includes a server 101 and two or more user devices 115. As described with reference to FIG. 3 above, the server 101 and the devices 115 may include game applications 109 with simulators 206 integrated therewith. Likewise, as discusses above, the user devices 115 may include displays 310 and/or game controllers 312 for users 125 associated with the user devices 115 to interact therewith.

During game play the user devices 115 may transmit game inputs 406 to one another. This transmission may occur over a computer network such as computer network 105. The simulator 206 on each user device 115 may simulate game play by applying the game inputs 406 to each frame along with game inputs 402 from the game controller 312. Once a frame in simulated by the simulator 206, the game application 109 may render the frame which may be provided to the display 310. This process continues until a game session ends. In one example, at the end of the game session, the user devices 115*a*, 115*b* transmit game inputs 408*a*, 408*b* to the server 101.

The game inputs 408*a*, 408*b* may include all of the game inputs for all of the frames of the game session, a portion of the game inputs for the game session, or game inputs for multiple game sessions. In the general case where all of the game inputs for all of the frames for the game session are transmitted to the server 101, the server 101 may re-simulate the game from the start of the game session to the ending of the game session and store the ending game state to a database 143. This re-simulation on the server 101 may be advantageous since one of the user devices 115 may have engaged in cheating during the game session. By re-simulating the game session, the server 101 may detect cheating by users and may transmit a cheating indicator to 410 to one or more user devices 115. More particularly, the server 101 may receive localized ending states from the user devices 115. The localized ending states may have been simulated respectively by simulators 206*a* and 206*b*. Where a localized ending state does not match the ending state simulated by the simulator 206*c* on the server 101 cheating may have occurred on the device with the abnormal localized ending states.

Since the game session is stored in the database 143, the game session may be restored by fetching the game session from the database 143 and restoring the game session as indicated by 410*a* and 410*b*.

Figure 5:
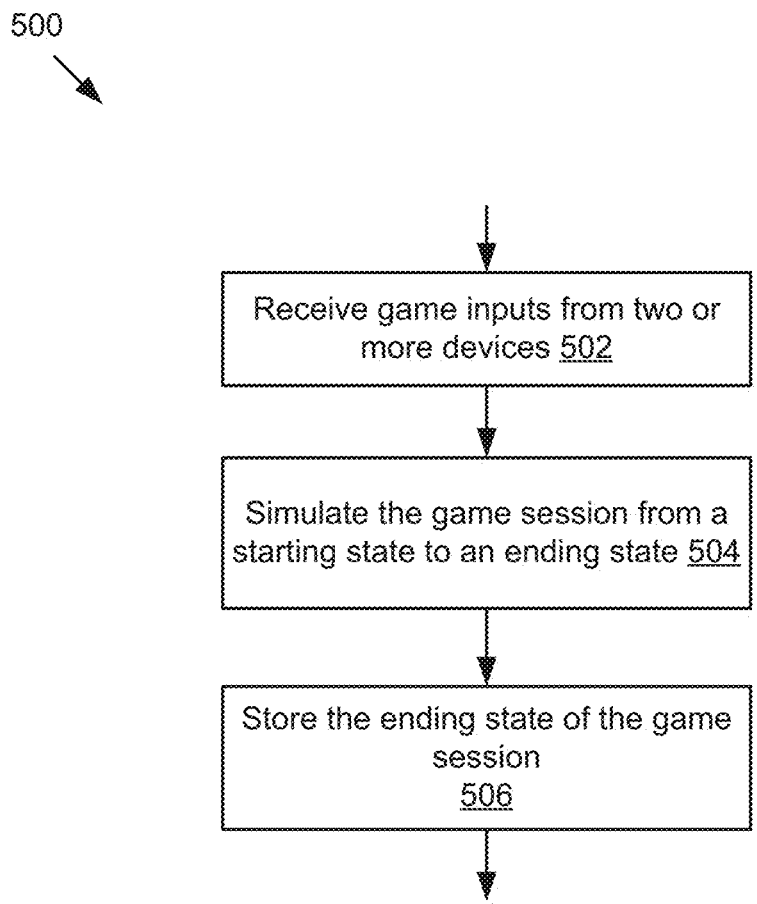
FIG. 5 is a flowchart of an example method for simulating a game played by two or more users according to some implementations.

FIG. 5 is a flowchart of an example method 500 for simulating a game played by two or more users on a server 101 according to some implementations. In some implementations, a control module 202 stored on the server 101 receives 502 game inputs from two or more user devices 115. Each of the two or more devices may be respectively operated by two or more users, and each game input may be associated with a frame in a game session. The simulator 206 simulates the game session from a starting state to an ending state by sequentially applying received game inputs at each frame. The ending state of the game session is stored 506 in the storage device 143 associated with the server 101.

Figure 6A:
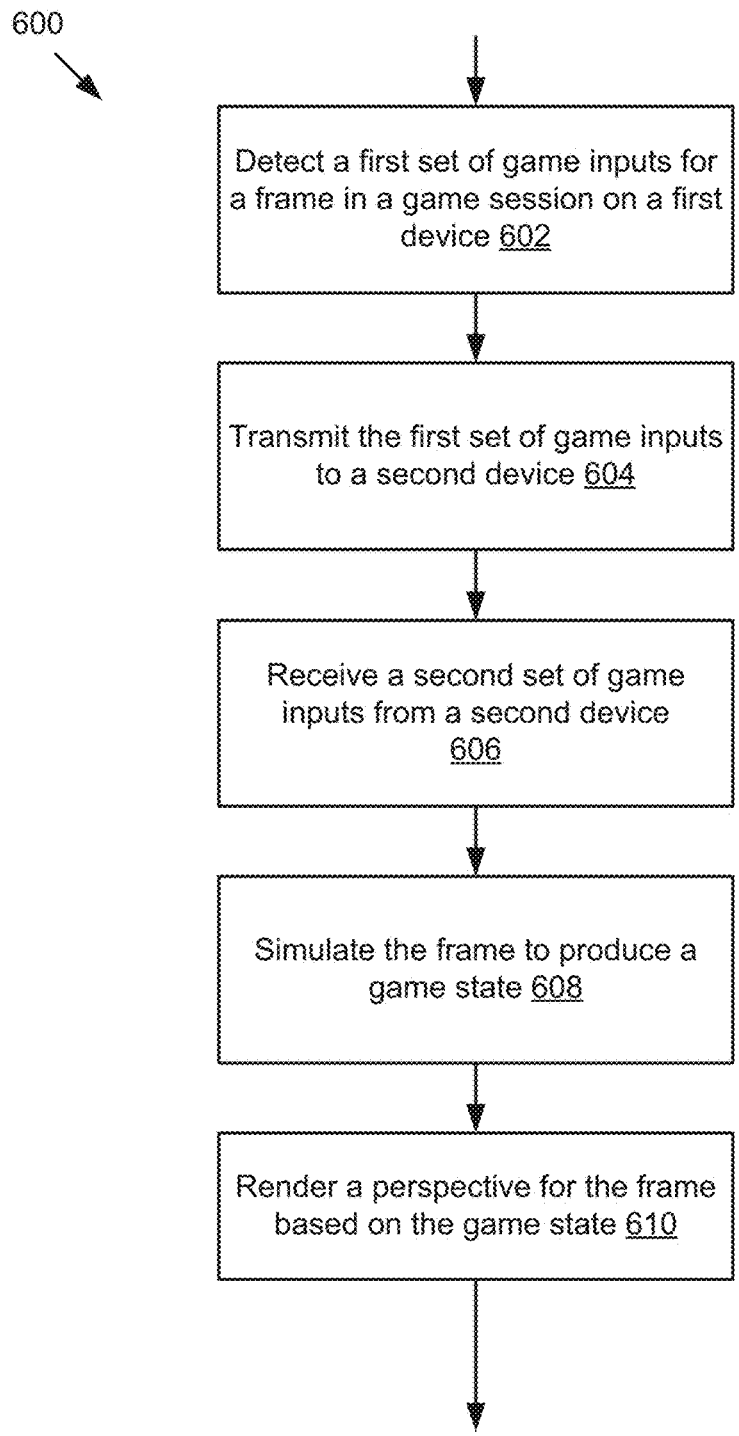
FIGS. 6A and 6B are flowcharts of example methods for conducting a multi-player game according to some implementations.

FIG. 6A is a flowchart of an example method 600 for conducting a multi-player game according to some implementations. In some implementations, a user interface module 208 on a first device detects 602 a first set of game inputs for a frame in a game session on a first device. The control unit 239 may transmit 604 the first set of game inputs to a second device. The control module 202 may request that the transmission be made by the communication unit 239. The communication unit 239 may receive 606 a second set of game inputs from a second device. The second set of game inputs may be associated with the frame in the game session. The communication unit 239 may forward this information onto the control module 202 for processing within the game application 109. The control module 202, may further forward on the first and second set of game inputs to the simulator 206. The simulator 206 may simulate 608 the frame to produce a game state. The simulator 206 may do this by applying the first set of game inputs and the second set of game inputs to the frame in the game session. The simulator may be configured so that the game state is consistently simulated on disparate hardware. The method 600 may continue with the user interface module 208 may render 610 a perspective for the frame based on the game state.

Figure 6B:
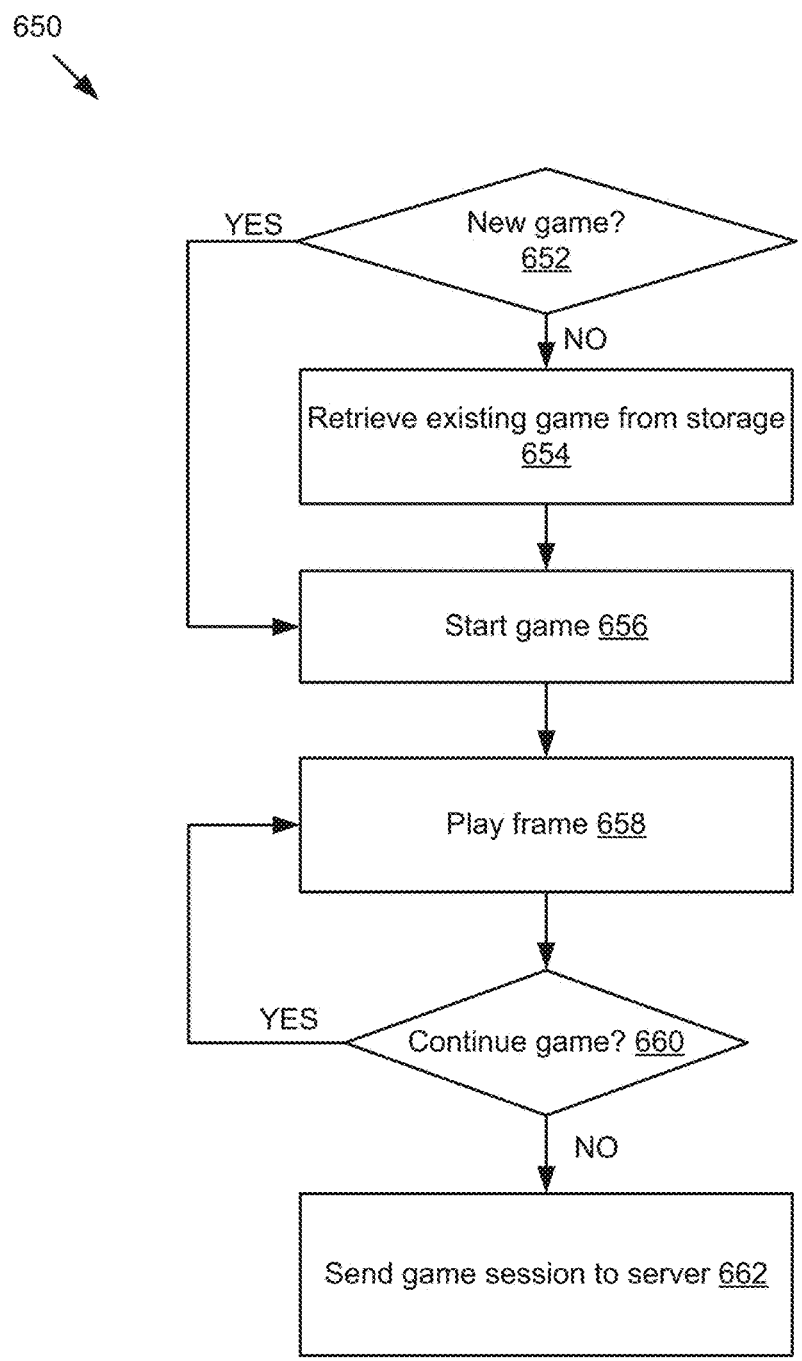

FIG. 6B is a flowchart of an example method 650 for conducting a multi-player game according to some implementations. The method begins by determining whether a new game 652 session is being starting or whether an existing game session is being initiated. If an existing game session is being initiated, then the existing game session is retrieved 654 from storage. Once the game is retrieved from storage or a new game is selected to be started, then a frame is played 658 and continues 660 until the game is over. Each frame is rendered based in part on the existing game state and the game inputs that have been made during the frame. In this way, the game session is rendered and controlled frame-by-frame until the game session ends. Game control includes game inputs from devices participating in the game session. As discussed here, the game inputs are transmitted between the user devices during the game session. Once the game session ends, the game session may be sent 662 to the game server. Later, the game session may be retrieved from storage as previously indicated by element 654 in the method 600.

Figure 7A:
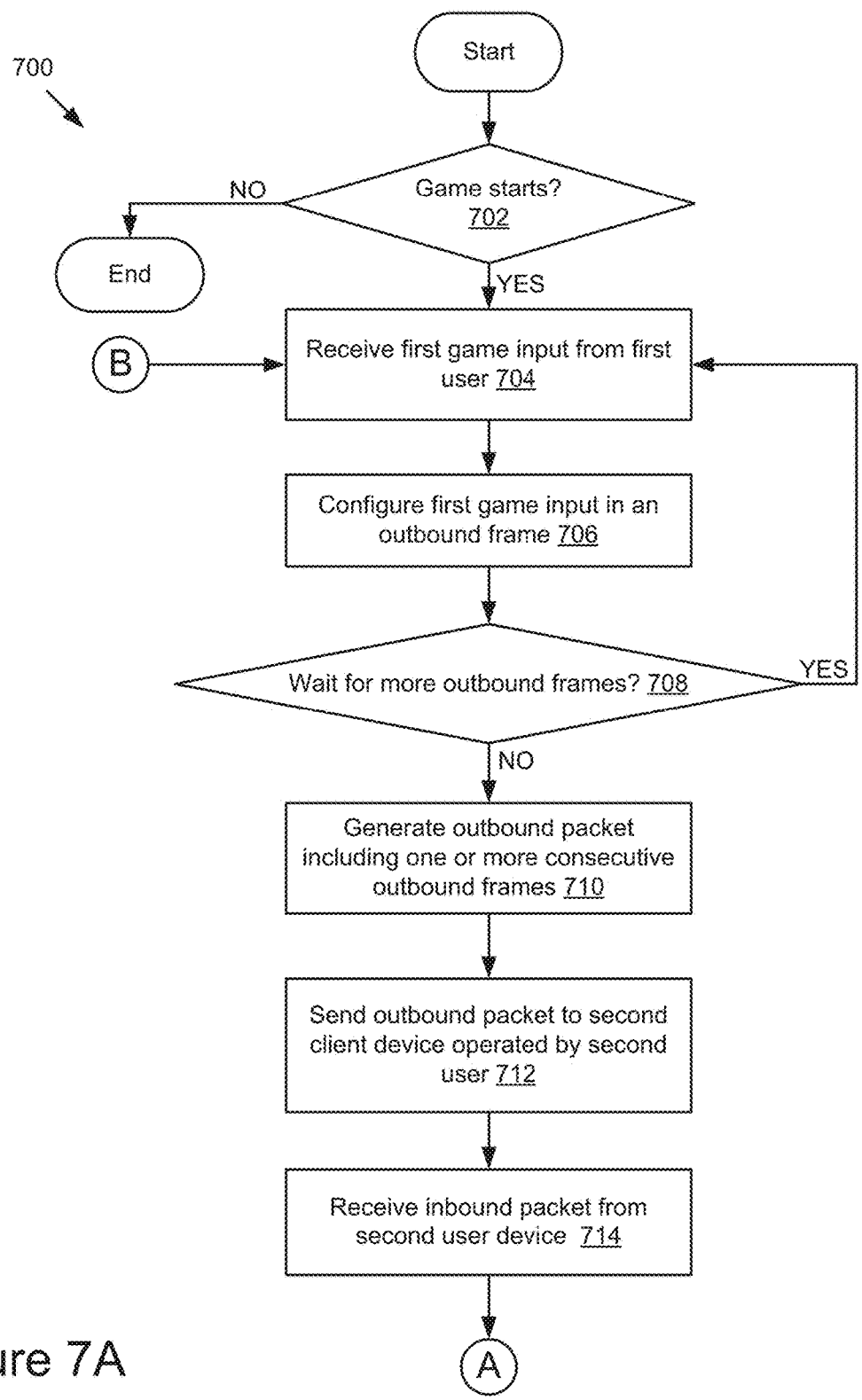
FIGS. 7A and 7B are flowcharts of an example method for providing a multi-player gaming service to users according to some implementations.
Figure 7B:
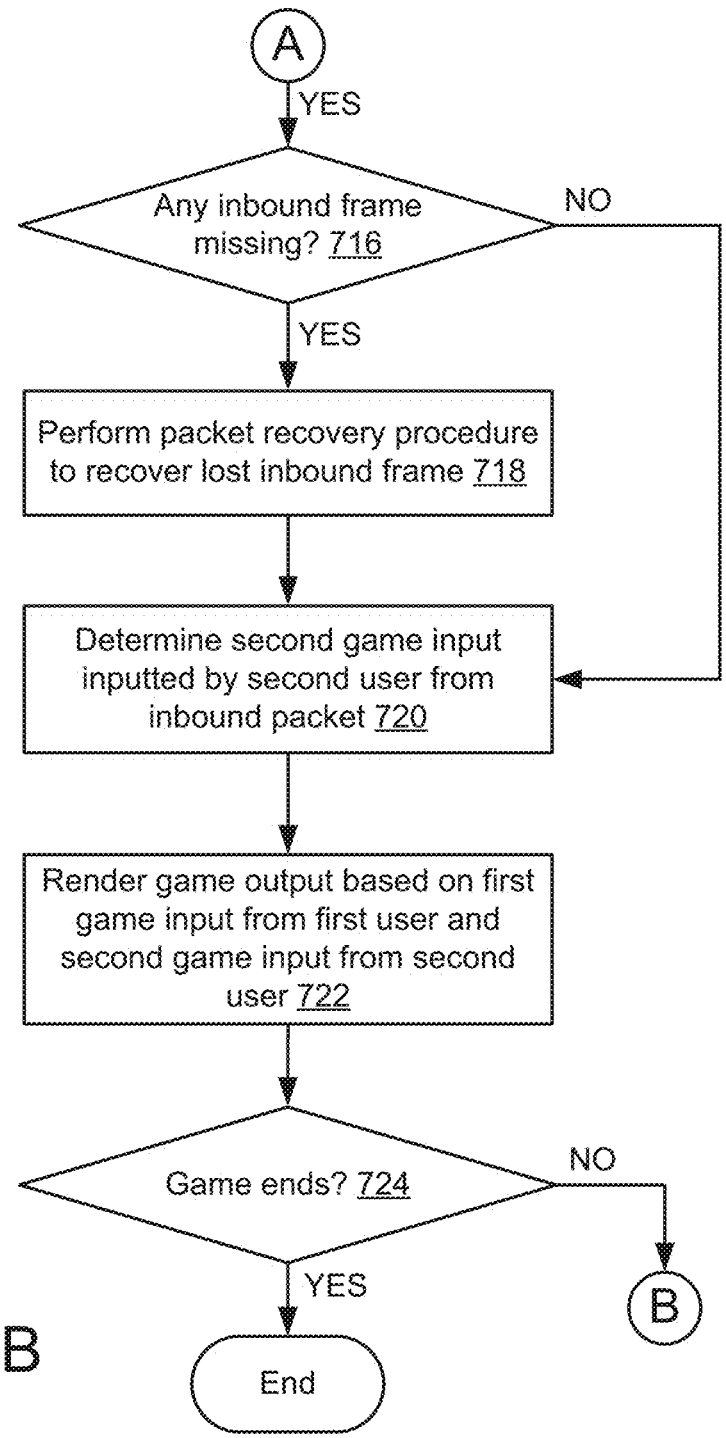

FIGS. 7A and 7B are flowcharts of an example method for providing a multi-player gaming service to users according to some implementations.

Referring to FIGS. 7A and 7B, an example method 700 for providing a multi-player gaming service to users is described. Turning to FIG. 7A, the method 700 determines 702 whether a game starts to play. If the game starts to play, the method 700 moves to step 704. Otherwise, the method 700 ends. At step 704, the control module 202 stored on a first user device 115 receives a first game input from a first user operating on the first user device 115. The packet module 204 stored on the first user device 115 configures 706 the first game input in an outbound frame. The packet module 204 determines 708 whether to wait for additional outbound frames before generating an outbound packet. If the packet module 204 determines to wait for more outbound frames, the method 700 moves to step 704. Otherwise, the method 700 moves to step 710. At step 710, the packet module 204 generates an outbound packet including one or more consecutive outbound frames. The control module 202 sends 712 the outbound packet to a second user device 115 operated by a second user that participates in the same game. The control module 202 receives 714 an inbound packet from the second user device 115.

Referring to FIG. 7B, the packet module 204 determines 716 whether any inbound frame from the second user device 115 is missing. If no inbound frame is missing, the method 700 moves to step 720. Otherwise, the method 700 moves to step 781. At step 718, the packet module 204 performs a packet recovery procedure to recover the lost inbound frame. The packet module 204 determines 720 a second game input provided by the second user from the inbound packet. The packet module 204 sends the first game input from the first user and the second game input from the second user to the simulator 206. The simulator 206 renders 722 a game output based on the first game input and the second game input. The simulator 206 determines 724 whether the game ends. If the game does not end, the method 700 moves to step 704. Otherwise, the method 700 ends.

Figure 8:
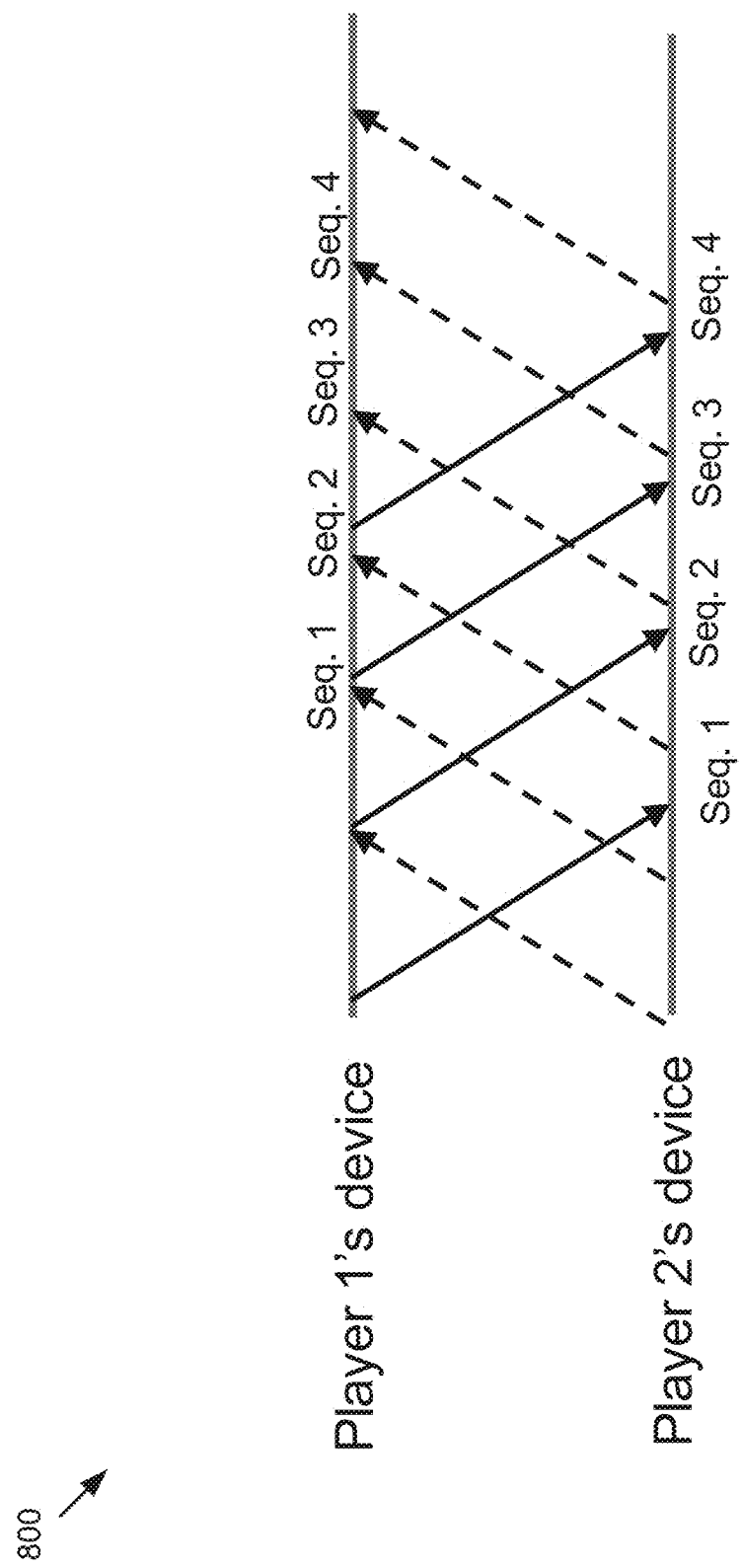
FIG. 8 is a graphic representation illustrating an example mechanism using low-latency UDP to communicate game inputs between game players according to some implementations.

FIG. 8 is a graphic representation 800 illustrating an example mechanism using low-latency UDP to communicate game inputs between game players according to some implementations. In the illustrated low-latency UDP mechanism, each user device 115 sends packets continuously to other user devices 115 that participate in the same game, without generating and sending any acknowledgements to each other.

Figure 9:
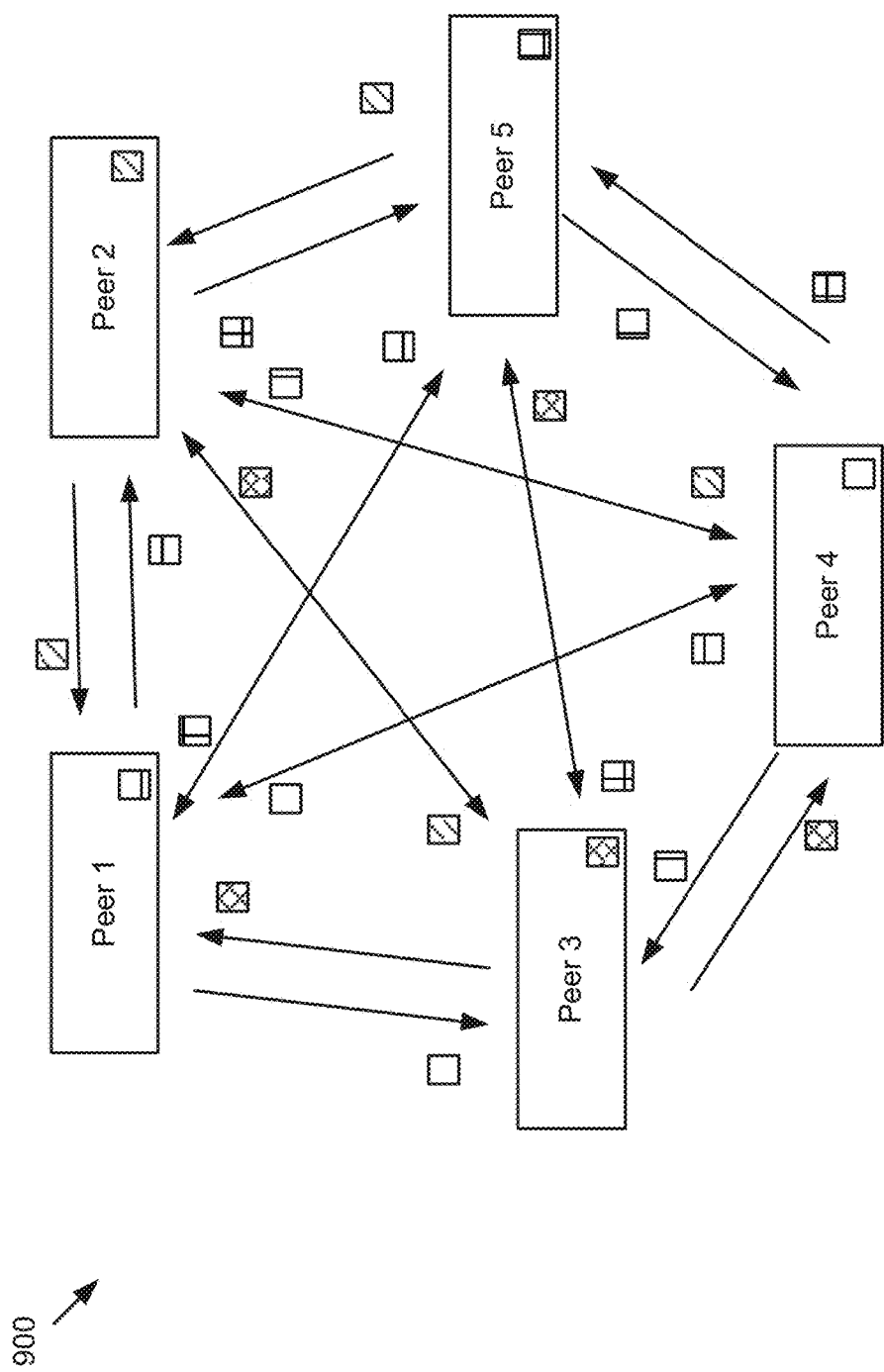
FIG. 9 is a graphic representation illustrating an example peer-to-peer network.

FIG. 9 is a graphic representation illustrating an example peer-to-peer network 900. In the illustrated network, each peer (e.g., each player) sends its outbound packet to all the other peers and receives an inbound packet from each of the other peers. The P2P network does not have any host and therefore is not vulnerable to any host hacking problems. In the P2P network, there is no overload to a particular peer, and the game can continue even if a peer (e.g., a player) is disconnected to the network.

In the above description, for purposes of explanation, numerous specific details are set forth in order to provide a thorough understanding of the specification. It will be apparent, however, to one skilled in the art that the invention can be practiced without these specific details. In other instances, structures and devices are shown in block diagram form in order to avoid obscuring the description. For example, the present embodiment is described in one embodiment below primarily with reference to user interfaces and particular hardware. However, the present embodiment applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer program product comprising a non-transitory computer usable medium including a computer readable program, wherein the computer readable program when executed on a computer causes the computer to:
   detect a first set of game inputs for a current frame in a game session on a first device;
   generate an outbound user datagram protocol packet including the first set of game inputs for the current frame and a first set of one or more redundant consecutive frames leading up to the current frame;
   transmit the outbound user datagram protocol packet to a second device;
   receive an inbound user datagram protocol packet from the second device, the inbound user datagram protocol packet including a second set of game inputs for the current frame and a second set of one or more redundant consecutive frames leading up to the current frame, the second set of game inputs from the second device;
   determine a lost frame that preceded the current frame, the lost frame being lost in transmission of a previous user datagram protocol packet from the second device to the first device;
   recover the lost frame from the second set of one or more redundant consecutive frames leading up to the current frame in the inbound user datagram protocol packet;
   simulate the current frame to produce a game state by applying the recovered lost frame, the first set of game inputs to the current frame, and the second set of game inputs to the current frame in the game session, the game state being consistently simulated on disparate hardware; and
   render a perspective for the current frame based on the game state.

2. The computer program product of claim 1, wherein the computer readable program when executed on the computer further causes the computer to: transmit a third set of game inputs to a gaming server, each of the third set of game inputs being associated with a frame in the game session, the third set of game inputs includes at least a portion of games inputs from one or more of: the first set of game inputs and the second set of game inputs.

3. The computer program product of claim 1, wherein the second device transmits the second set of game inputs to the first device over a computer network.

4. The computer program product of claim 1, wherein the computer readable program when executed on the computer further causes the computer to:
   transmit the game state to a game server for storage; and
   receive the game state from the game server.

5. The computer program product of claim 4, wherein the computer readable program when executed on the computer further causes the computer to: receive an indication from the game server indicating that the game state transmitted to the game server is fraudulent.

6. The computer program product of claim 1, wherein the perspective is rendered on the first device for a player associated with the first device.

7. The computer program product of claim 1, wherein the first device and the second device have different floating point precision.

8. The computer program product of claim 1, wherein the first device and the second device have different instruction set architectures (ISAs).

9. A computer-implemented method using one or more processors comprising:
   detecting a first set of game inputs for a current frame in a game session on a first device;
   generating an outbound user datagram protocol packet including the first set of game inputs for the current frame and a first set of one or more redundant consecutive frames leading up to the current frame;
   transmitting the outbound user datagram protocol packet to a second device;
   receiving an inbound user datagram protocol packet from the second device, the inbound user datagram protocol packet including a second set of game inputs for the current frame and a second set of one or more redundant consecutive frames leading up to the current frame, the second set of game inputs from the second device;
   determining a lost frame that preceded the current frame, the lost frame being lost in transmission of a previous user datagram protocol packet from the second device to the first device;
   recovering the lost frame from the second set of one or more redundant consecutive frames leading up to the current frame in the inbound user datagram protocol packet;
   simulating the current frame to produce a game state by applying the recovered lost frame, the first set of game inputs to the current frame, and the second set of game inputs to the current frame in the game session, the game state being consistently simulated on disparate hardware; and
   rendering a perspective for the current frame based on the game state.

10. The method of claim 9, further comprising: transmitting a third set of game inputs to a gaming server, each of the third set of game inputs being associated with a frame in the game session, the third set of game inputs includes at least a portion of games inputs from one or more of: the first set of game inputs and the second set of game inputs.

11. The method of claim 9, wherein the second device transmits the second set of game inputs to the first device over a computer network.

12. The method of claim 9, further comprising:
transmitting the game state to a game server for storage; and
receiving the game state from the game server.

13. The method of claim 12, further comprising: receiving an indication from the game server indicating that the game state transmitted to the game server is fraudulent.

14. The method of claim 9, wherein the perspective is rendered on the first device for a player associated with the first device.

15. The method of claim 9, wherein the first device and the second device have different floating point precision.

16. The method of claim 9, wherein the first device and the second device have different instruction set architectures (ISAs).

17. A system comprising:
a processor; and
a memory storing instructions that, when executed, cause the system to:
detect a first set of game inputs for a current frame in a game session on a first device;
generate an outbound user datagram protocol packet including the first set of game inputs for the current frame and a first set of one or more redundant consecutive frames leading up to the current frame;
transmit the outbound user datagram protocol packet to a second device;
receive an inbound user datagram protocol packet from the second device, the inbound user datagram protocol packet including a second set of game inputs for the current frame and a second set of one or more redundant consecutive frames leading up to the current frame, the second set of game inputs from the second device;
determine a lost frame that preceded the current frame, the lost frame being lost in transmission of a previous user datagram protocol packet from the second device to the first device;
recover the lost frame from the second set of one or more redundant consecutive frames leading up to the current frame in the inbound user datagram protocol packet;
simulate the current frame to produce a game state by applying the recovered lost frame, the first set of game inputs to the current frame, and the second set of game inputs to the current frame in the game session, the game state being consistently simulated on disparate hardware; and
render a perspective for the current frame based on the game state.

18. The system of claim 17, the memory further storing the instructions that, when executed, cause the system to transmit a third set of game inputs to a gaming server, each of the third set of game inputs being associated with a frame in the game session, the third set of game inputs includes at least a portion of games inputs from one or more of: the first set of game inputs and the second set of game inputs.

19. The system of claim 17, wherein the second device transmits the second set of game inputs to the first device over a computer network.

20. The system of claim 17, the memory further storing the instructions that, when executed, cause the system to:
transmit the game state to a game server for storage; and
receive the game state from the game server.

* * * * *